United States Patent
Hall et al.

(10) Patent No.: US 6,905,108 B2
(45) Date of Patent: Jun. 14, 2005

(54) CONTROL VALVE FLOW ADJUSTMENT DEVICE

(75) Inventors: Randy J. Hall, Marshalltown, IA (US); Ronald C. Burr, Marshalltown, IA (US); Mark D. Stiehl, Marshalltown, IA (US); Brian J. Burlage, Marshalltown, IA (US); Carter B. Cartwright, Ames, IA (US)

(73) Assignee: Fisher Controls International LLC., St. Louis, MO (US)

( * ) Notice: Subject to any disclaimer, the term of this patent is extended or adjusted under 35 U.S.C. 154(b) by 119 days.

(21) Appl. No.: 10/144,285

(22) Filed: May 10, 2002

(65) Prior Publication Data

US 2003/0089867 A1 May 15, 2003

Related U.S. Application Data

(60) Provisional application No. 60/335,626, filed on Nov. 15, 2001.

(51) Int. Cl.[7] ............................................. F16K 51/00
(52) U.S. Cl. ...................................................... 251/285
(58) Field of Search ................................ 251/285, 61.2

(56) References Cited

U.S. PATENT DOCUMENTS

| | | | | |
|---|---|---|---|---|
| 2,483,396 A | | 10/1949 | Benson | 287/58 |
| 3,397,863 A | * | 8/1968 | Bell | 251/285 |
| 3,521,667 A | * | 7/1970 | Johnson | 137/454.6 |
| 3,565,089 A | | 2/1971 | Thompson | 137/68 |
| 3,648,718 A | * | 3/1972 | Curran | 137/269 |
| 3,760,911 A | | 9/1973 | Porter et al. | 188/300 |
| 4,155,433 A | | 5/1979 | Porter | 188/300 |
| 4,198,030 A | | 4/1980 | Jackson et al. | 251/61.5 |
| 4,489,756 A | | 12/1984 | Balz | 137/625.33 |
| 4,588,163 A | | 5/1986 | Christensen | 251/285 |
| 4,699,354 A | | 10/1987 | Gibson et al. | 251/61.5 |
| 4,911,412 A | * | 3/1990 | Danko | 251/335.3 |
| 5,259,589 A | * | 11/1993 | Posner | 251/285 |
| 5,823,509 A | * | 10/1998 | Daniels | 251/335.2 |
| 6,196,523 B1 | * | 3/2001 | Miyata et al. | 251/276 |
| 6,446,539 B1 | * | 9/2002 | Niessen | 92/13.5 |

FOREIGN PATENT DOCUMENTS

| | | |
|---|---|---|
| DE | 197 16 915 A1 | 11/1998 |
| EP | 346 504 A1 | 12/1989 |
| FR | 988.036 | 8/1951 |
| FR | 2 462 637 | 2/1981 |
| GB | 1 293 069 | 10/1972 |
| GB | 1 391 128 | 4/1975 |

OTHER PUBLICATIONS

Masoneilan Varimax 30000 Series, The New Universal Control Valve, Dresser Flow Control, Specification Data CN3000, Sep. 2001, pp. 1–44.
V33 P+W FoxFlex, Rotary Globe Valves, Invensys Flow Control, PSS–4–22A1–NA, Oct. 2001, pp. 1–12.
International Search Report in PCT/US02/36855 dated Mar. 18, 2003.

* cited by examiner

*Primary Examiner*—Edward K. Look
*Assistant Examiner*—John K. Fristoe, Jr.
(74) *Attorney, Agent, or Firm*—Marshall, Gerstein & Borun LLP

(57) ABSTRACT

A valve includes a fluid inlet passage having a fluid inlet, a fluid outlet passage, an orifice between the fluid inlet passage and the fluid outlet, and a moveable valve plug adapted to move with respect to the orifice to vary the flow of fluid between the fluid inlet passage and the fluid outlet passage. A movable valve stem is attached to the valve plug and a travel limiting device is attached to the valve stem. The travel limiting device permits the valve to be placed in one of a plurality of desired flow configurations.

22 Claims, 7 Drawing Sheets

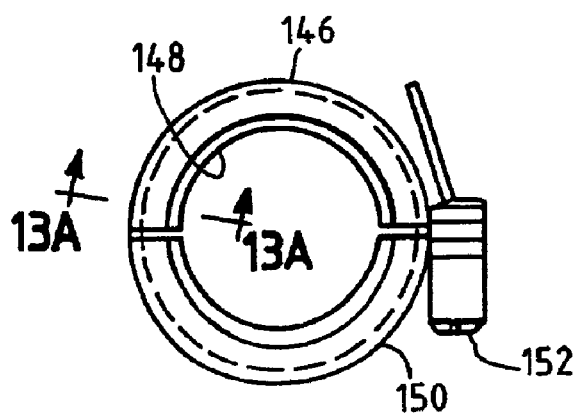
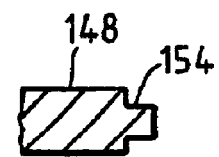
FIG. 13
FIG. 13A
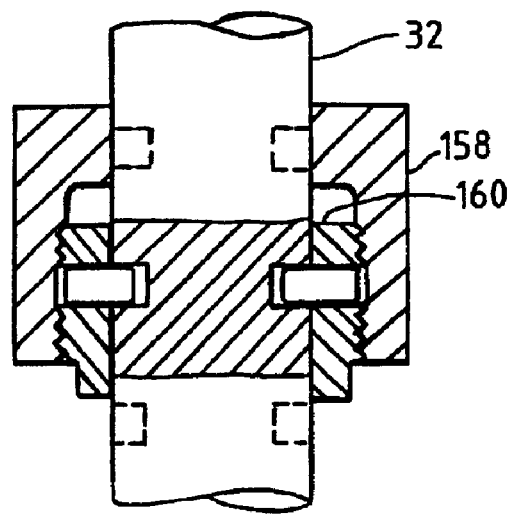
FIG. 14

CONTROL VALVE FLOW ADJUSTMENT DEVICE

RELATED APPLICATION

This application claims the benefit of provisional application Ser. No. 60/335,626, filed Nov. 15, 2001, entitled "CONTROL VALVE FLOW ADJUSTMENT DEVICE."

FIELD OF THE INVENTION

This invention relates generally to valves and more particularly to on/off valves, throttling valves and control valves having flow rate adjustment devices therein.

DESCRIPTION OF THE RELATED ART

Throttling valves, on/off valves and control valves are used in a wide number of process control system applications to control some parameter of a process fluid. While the process control system uses such a valve to ultimately control the pressure, level, pH or other desired parameter of a fluid, the valve basically controls the rate of fluid flow.

Typically, an on/off valve, throttling valve, or control valve includes a fluid inlet passage coupled through an orifice to a fluid outlet passage and a closure member disposed in the orifice, which controls the amount of fluid flow therethrough. The closure member may include a valve plug having a surface which seats against a seat ring disposed at the orifice. During operation, the control system moves the valve plug towards and away from a surface of the seat ring to provide a desired fluid flow through the orifice and, therefore, the valve. Typically, in order to ensure that the valve would achieve the desired flow parameters, separate sets of valve plugs and seat rings were required. Replacement of valve plugs and/or seat rings can necessitate disassembly and reassembly of the valve, which results in additional labor, and additional period during which the valve cannot be used. Accordingly, it is desirable to be able to achieve a plurality of desired flow parameters by using a single valve plug and a single seat ring.

SUMMARY OF THE INVENTION

An apparatus according to the invention is provided that limits the travel of the valve stem. This provides for a precise control over flow characteristics by placing the plug in one of a plurality of predetermined positions to achieve a desired one of a plurality of predetermined flow characteristics within the valve.

The apparatus may include a one-piece or two-piece collar that is releasably secured to the valve stem.

BRIEF DESCRIPTION OF THE DRAWINGS

The advantages of the present invention will be apparent upon reading the following description in conjunction with the drawings, in which:

FIG. 13 is a plan view of yet another embodiment of a flow adjustment device, that includes a two-piece inner collar and a hose clamp outer collar;

FIG. 13A is a cross-sectional view of the flow adjustment device depicted in FIG. 13, taken along lines 13A—13A of FIG. 13;

FIG. 14 is a partial cross-sectional view of a flow adjustment device that includes inner and outer flow adjuster collars threadably attached to one another;

DETAILED DESCRIPTION

Figure 1:
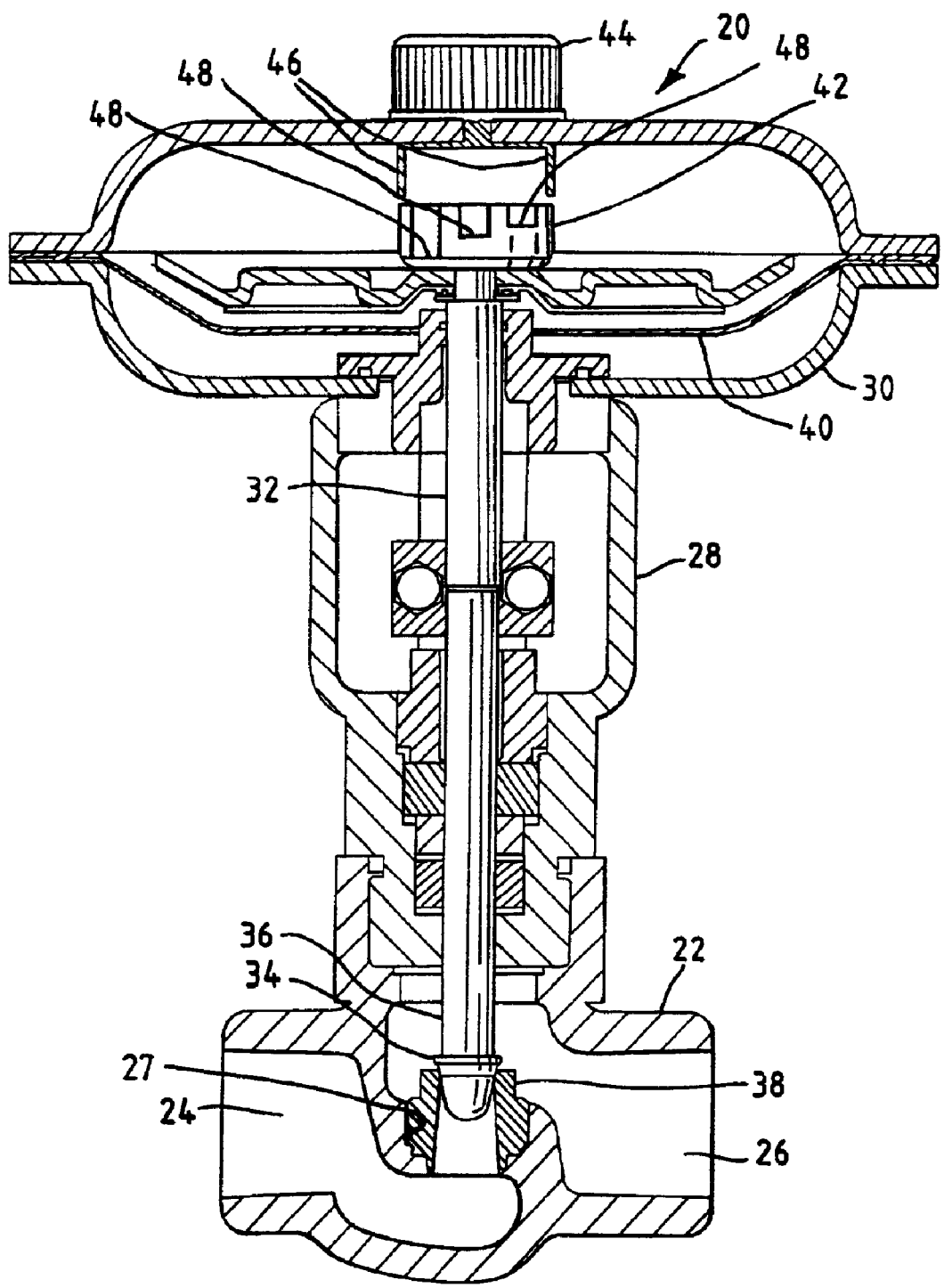
FIG. 1 is a cross-sectional view of a valve including a flow adjustment device.

With reference initially to FIG. 1, a stem valve assembly 20 includes a valve body 22 that includes an outlet passage 24 and an inlet passage 26, an orifice 27 disposed between the outlet passage 24 and the inlet passage 26, a bonnet 28, and a diaphragm casing 30. (In an alternate example, the inlet passage 26 and the outlet passage 24 may be reversed, such that the fluid inlet passage becomes the fluid outlet passage, and the fluid outlet passage becomes the fluid inlet passage, thereby changing a downward flow valve to an upward flow valve.) A valve stem 32 extends through the diaphragm casing 30, the bonnet 28, and partially into the valve body 22. A valve plug 34 is attached to a lower end 36 of the valve stem 32, as oriented in FIG. 1. The valve plug 34 is sized and shaped to sealingly engage a valve seat 38 disposed within the orifice 27 within the valve body 22 when the valve assembly 20 is in a closed configuration. The valve stem 32 may be moved vertically in a known manner with respect to the bonnet 28, the diaphragm casing 30, and the valve body 22. For example, a diaphragm 40 within the diaphragm casing 30 may be used to facilitate vertical movement of the valve stem 32.

A cup-shaped piece 42 may be secured to the upper end of the valve stem 32 to facilitate precise movement of the valve stem 32 into one of a plurality of positions, for example, three positions as depicted in FIG. 1. As shown in FIG. 1, an adjustment knob 44 is rotatably attached to the diaphragm casing 30 and disposed above the cup-shaped piece 42. The adjustment knob 44 includes a plurality of adjustment fingers 46 that are sized to engage one of three stepped surfaces 48 of the cup-shaped piece 42.

Figure 2:
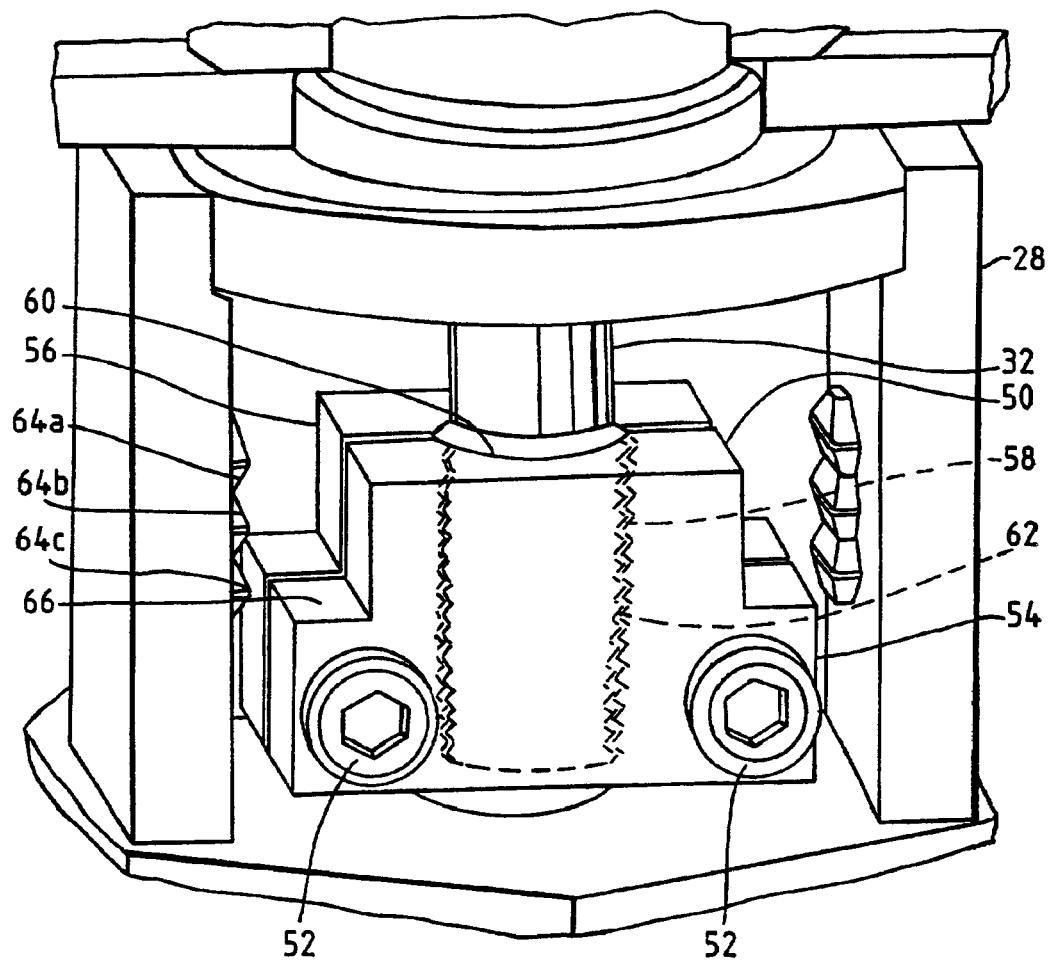
FIG. 2 is a perspective view of another embodiment of a flow adjustment device mounted to a valve stem.

With reference to FIG. 2, a two-piece collar 50 may be releasably secured to the valve stem 32, to provide an alternative means of limiting the travel of the valve stem 32. For example, as depicted in FIG. 2, the two-piece collar 50 may be clamped to the valve stem 32 using a pair of fasteners 52. The two-piece collar 50 includes first and second collar halves 54 and 56, each including serrations 58 on an interior surface 60. The serrations 58 on the interior surfaces 60 of the collar halves 54 and 56 are shaped and sized to mate with stem serrations 62 disposed on the valve stem 32. The pitch of the serrations 58 configured in such a way so as to permit fine-tuning of flow capacity.

Thus, the position of the two-piece collar 50 on the valve stem 32 may be adjusted by loosening the fasteners 52, moving the two-piece collar 50 up or down on the valve stem 32 as may be desired, and re-tightening the fasteners 52.

A visual indicator structure may be included in the valve assembly 20 if desired. For example, a plurality of protrusions 64a, 64b and 64c, may be disposed on the bonnet 28, as shown in FIG. 2. The protrusions 64a, 64b and 64c may be aligned with a surface of the two-piece collar 50, such as for example, stepped surfaces 66 of the collar halves 54 and 56. In the embodiment shown in FIG. 2, a valve operator or inspector may visually confirm that the valve assembly 20 is in a desired flow configuration by checking that the step surfaces 66 are aligned with the protrusion 64a, 64b, and 64c that is associated with the desired flow condition.

For example, the protrusion 64A could correspond to a ½ inch port, 6$C_v$ flow configuration, the protrusion 64B could correspond to a ⅜ inch port, 4$C_v$ flow configuration, and the protrusion 64C could correspond to a ¼ inch port, 2$C_v$ flow configuration.

Figure 3:
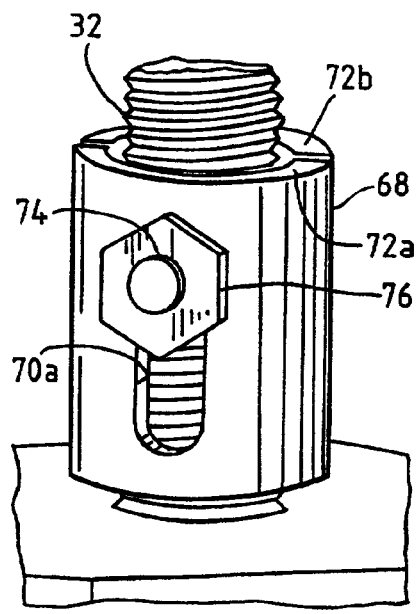
FIG. 3 is a front perspective view of another alternative embodiment of a flow adjustment device mounted to a valve stem.
Figure 4:
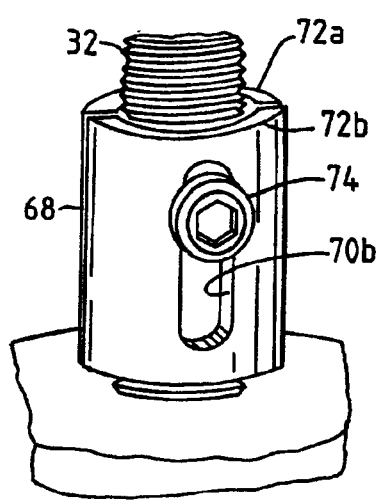
FIG. 4 is a rear perspective view of the flow adjustment device of FIG. 3.

As shown in FIGS. 3 and 4, an alternative configuration includes a cylindrical collar 68 that includes elongate slots 70a and 70b. The cylindrical collar 68 includes collar halves 72a and 72b each having an elongated slot 70a or 70b, respectively, disposed therein. A fastener 74 passes through the slots 70a and 70b and through a bore (not shown in FIGS. 3 and 4) in the valve stem 32. The fastener 74 may be secured to the cylindrical collar 68 using a nut 76.

The fastener 74 and the nut 76 serve to secure the collar halves 72A and 72B together with one another and to the valve stem 32. Each cylindrical collar half 72A and 72B includes serrations (not shown in FIGS. 3 and 4, but that may be substantially the same as the serrations 58 shown in FIG. 2) on interior surfaces thereof that are sized and shaped to mate with the stem serrations 62.

Figure 5:
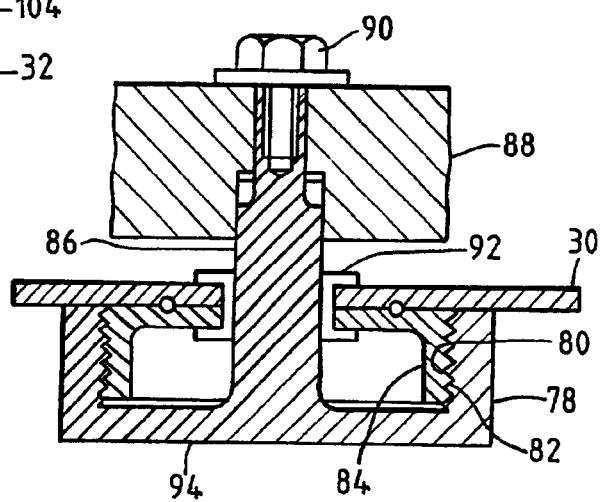
FIG. 5 is a cross-sectional view of yet another embodiment of a flow adjustment device mounted to a diaphragm casing of a valve.

With reference to FIG. 5, another embodiment of a flow adjustment mechanism is shown. A first cup-shaped stem adjuster piece 78 includes an interior threaded surface 80 that engages an exterior threaded surface 82 on a second cup-shaped stem adjuster 84 that is spot welded to the diaphragm casing 30. The first cup-shaped stem adjuster piece 78 includes a post portion 86 that extends through the diaphragm casing 30 and may be attached to an adjustment knob 88 by a fastener 90. A seal 92 is disposed between the post 86 and the casing 30. A lower surface 94 of the first cup-shaped stem adjuster piece 78 contacts, or may be attached to, the valve stem 32. Accordingly, by rotating the knob 88, the first cup-shaped stem adjuster 78 may be raised or lowered to adjust the vertical position of the valve stem 32.

Figure 6:
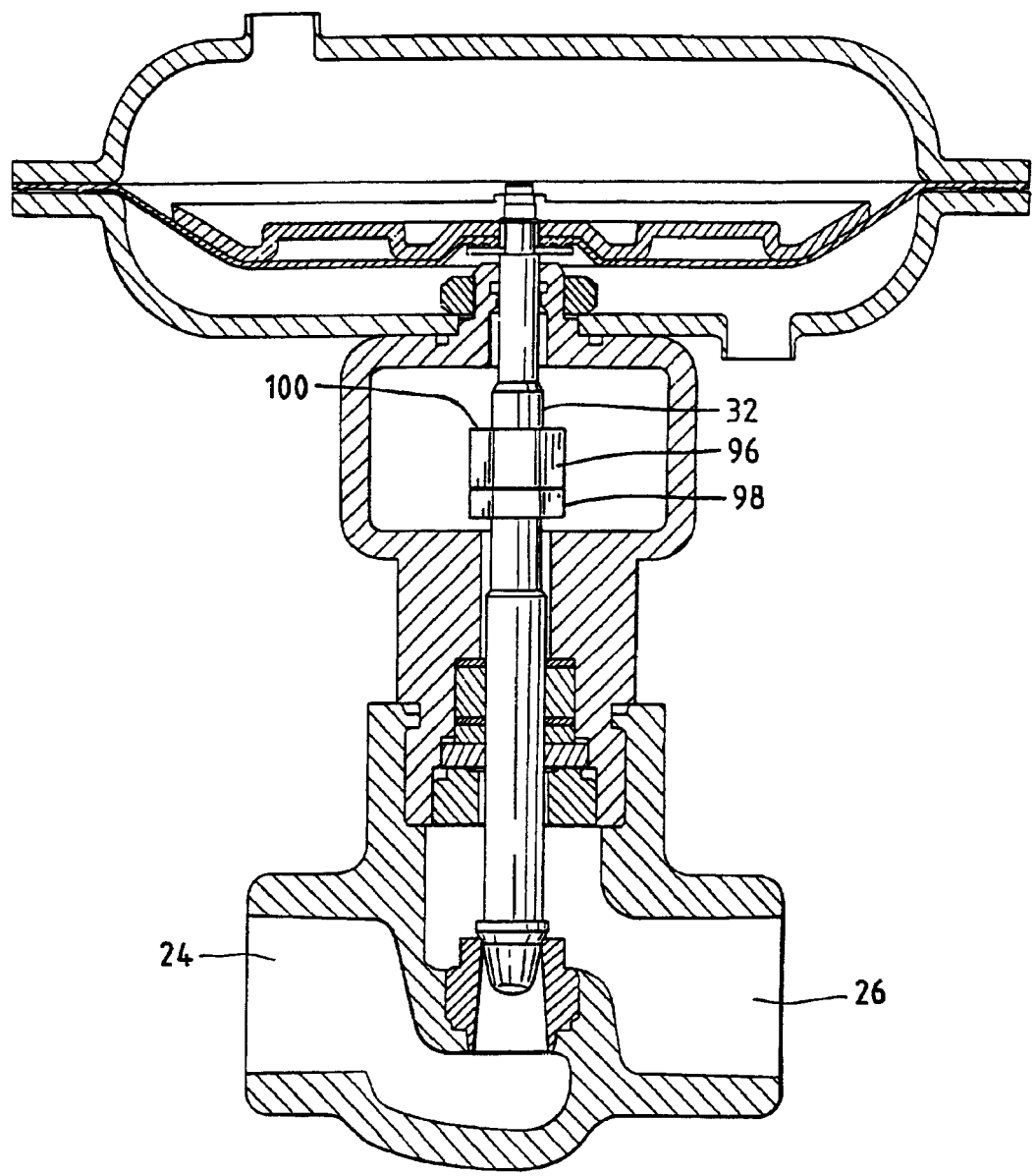
FIG. 6 is a cross-sectional view of yet another embodiment of a flow adjustment device.

With reference to FIG. 6, an alternative configuration is shown for a flow adjuster collar 96 that is threadably attached to the valve stem 32. The flow adjuster collar 96 may be moved vertically along the valve stem 32 simply by rotating the flow adjuster collar 96 with respect to the valve stem 32. Once the flow adjuster collar 96 is in a desired position, it is secured in that position by tightening a locking nut 98 against the flow adjuster collar 96. The locking nut 98 is also threadably disposed on the valve stem 32. In order to determine whether the flow adjuster collar 96 is in a desired position to achieve a desired flow rate, visual indicators, such as, for example, the protrusions 64a, 64b, and 64c (FIG. 2) may be used to determine the alignment thereof with an upper surface 100 of the flow adjuster collar 96.

Figure 7:
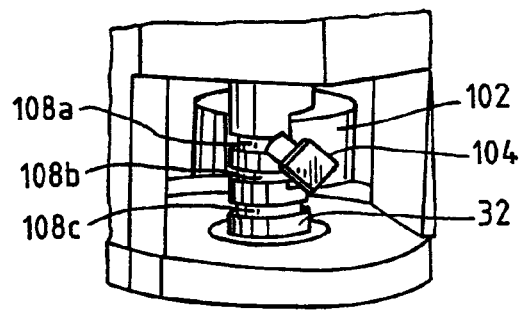
FIG. 7 is a perspective view of still another embodiment of a flow adjustment device mounted to a valve stem by means of a set screw.

With reference to FIG. 7, a still further alternative embodiment of a flow adjustment mechanism is depicted, in which a flow adjuster collar 102 is disposed on the valve stem 32 and secured in place by means of a cylindrical member, such as a set screw 104 that passes through a threaded bore 106 in the flow adjuster collar 102. The set screw 104 engages one of a plurality of circumferential grooves 108a, 108b, 108c, in the valve stem 32.

Figure 8:
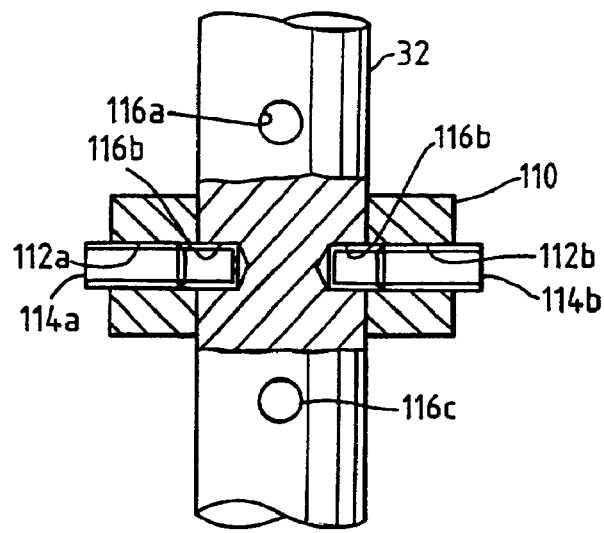
FIG. 8 is a side view and partial cross-section of still another embodiment of a flow adjustment device mounted to a valve stem by means of a pair of set screws.

With reference to FIG. 8, another alternative configuration is depicted, in which a flow adjuster collar 110 includes a pair of transverse bores 112a and 112b disposed at opposite sides thereof. A pair of set screws 114a, 114b are threadably received within the transverse bores 112a and 112b, respectively, and engage one of three pairs of blind holes 116a, 116b, or 116c, in the valve stem 32. In order to move the flow adjuster collar 110 into a desired position, the set screws 114a and 114b are loosened to a point where they do not protrude into the blind holes 116a, 116b, or 116c, the flow adjuster collar 110 is adjusted to the desired height, and the set screws are re-tightened to extend into one of the other pairs of blind holes 116a, 116b, or 116c, as desired.

Figure 9:
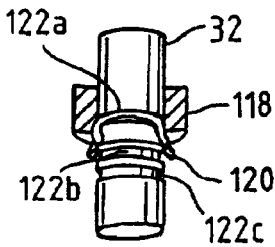
FIG. 9 is a partially cut-away perspective view of another embodiment of a flow adjustment device mounted to a valve stem by means of a snap pin.

As shown in FIG. 9, in accordance with a still further embodiment, a flow adjuster collar 118 may be secured in a desired position by means of a snap pin 120 that engages a desired circumferential groove 122a, 122b, or 122c to achieve a desired flow configuration. Of course, although not shown in the drawings, a snap ring, a cotter pin, or any other suitable device could be substituted for the snap pin 120.

Figure 10:
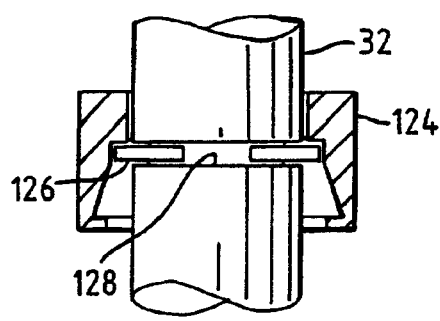
FIG. 10 is a partially cut-away side view of yet another alternative embodiment of a flow adjustment device mounted to a valve stem by means of a spring ring.

As shown in FIG. 10, another alternative embodiment includes a flow adjuster collar 124 that engages a spring ring 126. By pressing downward on the flow adjuster collar 124, as oriented in FIG. 10, the spring ring 126 is compressed and secured within a circumferential groove 128 in the valve stem 32. By applying upward pressure on the flow adjuster collar 124 as oriented in FIG. 10, the spring ring 126 is permitted to expand and thereby disengage the circumferential groove 128 to permit movement of the flow adjuster collar along the length of the valve stem 32.

Figure 11:
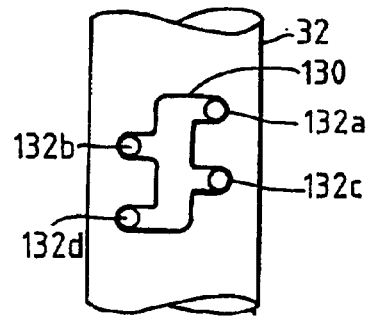
FIG. 11 is a side view of a valve stem incorporating a "shift gated" pattern of vertical and horizontal grooves connecting a set of blind holes for removably securing a flow adjustment device to the valve stem.

FIG. 11 depicts a configuration similar to that of FIG. 8, wherein a "shift gate" pattern of vertical and horizontal grooves 130 (as oriented in FIG. 11) connects a set of four blind holes 132a, 132b, 132c, and 132d in the valve stem 32. The "shift gate" pattern of grooves 130 assists in guiding the collar into a desired position. The "shift gate" pattern of grooves 130 and blind holes 132a, 132b, 132c, and 132d may be provided on two opposite sides of the valve stem 32.

Figure 12:
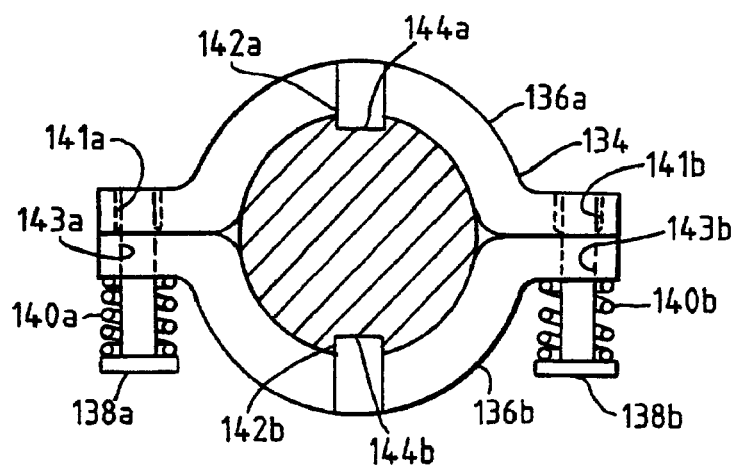
FIG. 12 is a view of a further alternative embodiment of a flow adjustment device that includes a two-piece flow adjuster collar removably mounted to a valve stem.

As shown in FIG. 12, a further alternative configuration includes a two-piece flow adjuster collar 134 that includes collar halves 136a and 136b that may be joined to one another by means of guide pins 138a and 138b that are threaded at one end thereof and loaded by springs 140a and 140b in the vicinity of an opposite end thereof. The guide pins 138a and 138b may thus be threaded into threaded bores 141a and 141b, respectively, in the collar half 136a, and pass through smooth bores 143a and 143b, respectively, in the collar half 136b. Anchoring pins 142a and 142b extend from the collar halves 136a and 136b, respectively, and extend into blind holes 144a and 144b in the valve stem 32. The anchoring pins 142a and 142b may be attached to the collar halves 136a and 136b by threads, welds, or any other appropriate means of attachment, or could be integral to the collar halves 136a and 136b. In order to move the two-piece flow adjuster collar 134 along the valve stem 32, the guide pins 138a and 138b may be simply pressed toward the two-piece flow adjuster collar 134 to push the collar half 136a away from the collar half 136b until the collar halves 136a and 136b separated from one another sufficiently to move the anchoring pins 142a and 142b out of the blind holes 144a and 144b, after which the two-piece collar 134 may be repositioned by releasing the guide pins 138a and 138b so that the springs 140a and 140b may press the collar half 136a back into the position shown in FIG. 12, into contact with the collar half 136b.

Yet another configuration for a flow adjuster collar 146 is depicted in FIGS. 13 and 13A, in which the flow adjuster collar 146 includes a two-piece inner collar 148, depicted in cross section in FIG. 13A, and an outer hose clamp fitting 150 that includes an adjustment screw 152, that permits tightening or loosening of the outer hose clamp fitting 150. The two-piece inner collar 148 includes an annular protrusion 154, sized and shaped to engage circumferential grooves in the valve stem 32, such as the circumferential grooves 108a, 108b, and 108c shown in FIG. 7.

FIG. 14 depicts yet another alternative embodiment, in which a two-piece flow adjuster collar includes an outer collar 158 and an inner collar 160. The inner collar 160 is configured in a similar fashion to the flow adjuster collar shown in FIG. 8, and is adapted to be repositioned in one of a plurality of locations along the valve stem 32. In addition, the outer collar 158 is threadably attached to the inner collar 160, and thereby facilitates fine tuning of the travel limit of the valve stem 32.

Figure 15:
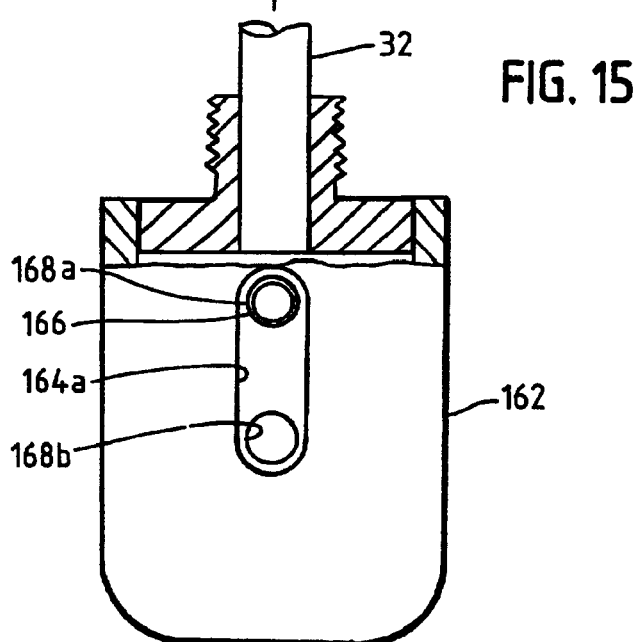
FIG. 15 is a side view of a bonnet incorporating yet another embodiment of a flow adjuster device that includes a slot on either side of the bonnet to limit the travel of the valve stem.
Figure 15A:
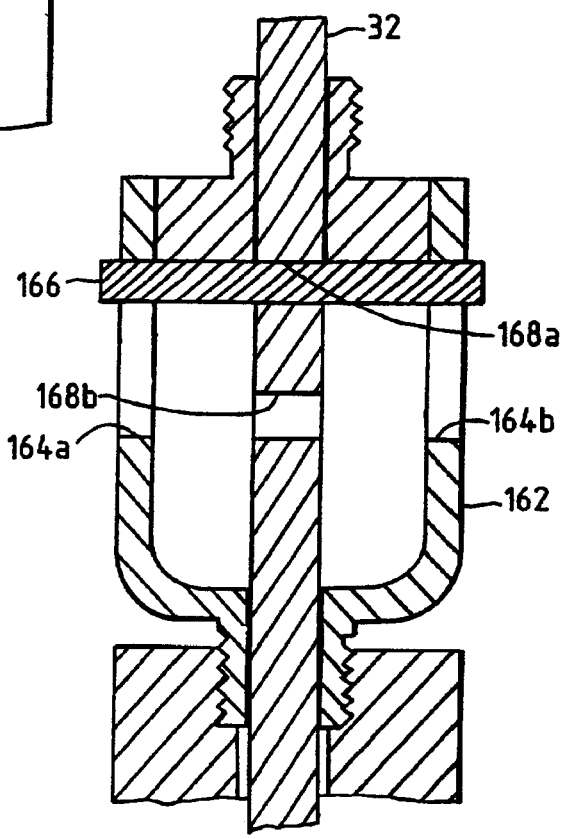
FIG. 15A is a cross sectional view of the embodiment shown in FIG. 15 taken along lines 15A—15A of FIG. 15.

FIGS. 15 and 15A depict yet another configuration for limiting the travel of the valve stem 32 to achieve one of a plurality of desired flow configurations. The embodiment of FIGS. 15 and 15A includes a bonnet 162 having a substantially closed structural configuration, rather than an open frame structural configuration, for example, as depicted in FIG. 1. The bonnet 162 may include surface features, such as, for example, a pair of vertical slots 164a and 164b are disposed on opposite sides of the bonnet 162. The vertical slots 164a and 164b provide travel stops to limit the movement of the valve stem 32 by limiting the travel of a stop pin 166. The stop pin 166 is threadably or otherwise removably disposed within one of a plurality of through bores 168a and 168b in the valve stem 32. Each of the through bores 168a and 168b corresponds to a desired flow configuration.

The foregoing detailed description has been given for clearness of understanding only and no unnecessary limitations should be understood therefrom, as modifications will be obvious to those skilled in the art. For example, the invention is applicable to many types of valves in addition to on/off valves, throttling valves, and control valves.

What is claimed is:

1. A valve, comprising:
   a housing containing a fluid inlet passage and a fluid outlet passage;
   an orifice disposed between the fluid inlet passage and the fluid outlet passage;
   a movable valve plug adapted to move with respect to the orifice to vary the flow of fluid between the fluid inlet passage and the fluid outlet passage;
   a movable valve stem attached to the valve plug, the moveable valve stem including a plurality of serrations disposed thereon and an integral travel limiting device for adjusting a valve travel limit wherein adjustments to a valve travel limit can be made outside the housing such that the adjustments upon the serrations provide a plurality of predefined positions that correspond to a predetermined maximum flow capacity of the valve.

2. The valve of claim 1, wherein the integral travel limiting device includes serrations shaped and sized to mate with the moveable valve stem serrations.

3. The valve of claim 1, wherein the integral travel limiting device includes a collar releasably attached to the moveable valve stem.

4. The valve of claim 3, wherein the collar includes a plurality of collar pieces releasably attached to one another.

5. The valve of claim 4, wherein at least one of the collar pieces includes an opening.

6. The valve of claim 5, wherein the opening is an elongate slot.

7. The valve of claim 5, wherein the at least one movable member includes a spring ring.

8. The valve of claim 3, wherein the collar is releasable attached to the valve stem by at least one movable member that engages an indentation on the valve stem.

9. The valve of claim 8, wherein the indentation is a blind hole.

10. The valve of claim 8, wherein the indentation is a through bore.

11. The valve of claim 8, wherein the indentation is a circumferential groove.

12. The valve of claim 8, wherein the indentation includes a "shift gate" pattern of grooves.

13. The valve of claim 8, wherein the at least one movable member includes a set screw.

14. The valve of claim 8, wherein the at least one movable member includes a fastener.

15. The valve of claim 1, wherein the travel limiting device includes a collar threadably attached to the moveable valve stem.

16. The valve of claim 15, further including a lock nut threadably attached to the valve stem.

17. The valve of claim 1, wherein the valve includes a casing, and the travel limiting device includes an adjustment knob threadably attached to the casing.

18. The valve of claim 1, wherein the travel limiting device includes a knob having a plurality of adjustment fingers extending therefrom.

19. A valve, comprising:
   a housing containing a fluid inlet passage and a fluid outlet passage;
   an orifice disposed between the fluid inlet passage and the fluid outlet passage;
   a movable valve plug adapted to move with respect to the orifice to vary the flow of fluid between the fluid inlet passage and the fluid outlet passage;
   a movable valve stem attached to the valve plug, the moveable valve stem including a plurality of serrations disposed thereon and an integral travel limiting device for adjusting a valve travel limit wherein adjustments to a valve travel limit can be made outside the housing;

the integral travel limiting device further including serrations shaped and sized to mate with the moveable valve stem serrations such that the adjustments to the valve travel limit correspond to a maximum flow capacity of the valve.

20. The valve of claim 19, wherein the integral travel limiting device includes a collar releasably attached to the moveable valve stem.

21. The valve of claim 20, wherein the collar includes a plurality of collar pieces releasably attached to one another.

22. A valve, comprising:

a housing containing a fluid inlet passage and a fluid outlet passage;

an orifice disposed between the fluid inlet passage and the fluid outlet passage;

a movable valve plug adapted to move with respect to the orifice to vary the flow of fluid between the fluid inlet passage and the fluid outlet passage;

a movable valve stem attached to the valve plug, the moveable valve stem including a plurality of serrations disposed thereon and an integral travel limiting device for adjusting a valve travel limit wherein adjustments to a valve travel limit can be made outside the housing, the travel limiting device further including a collar threadably attached to the moveable valve stem such that the adjustments to the valve travel limit correspond to a maximum flow capacity of the valve.

* * * * *